(12) United States Patent
Shetty et al.

(10) Patent No.: US 10,199,984 B2
(45) Date of Patent: Feb. 5, 2019

(54) HOUSING FOR SOLAR PANEL ELECTRIC CONNECTION

(71) Applicant: TE Connectivity India Private Limited, Bangalore (IN)

(72) Inventors: Praneeth Prabhakar Shetty, Udupi (IN); Gururaj Settru, Bangalore (IN); Suresh Thota, Hyderabad (IN)

(73) Assignee: TE Connectivity India Private Limited, Bangalore (IN)

( * ) Notice: Subject to any disclaimer, the term of this patent is extended or adjusted under 35 U.S.C. 154(b) by 0 days.

(21) Appl. No.: 15/188,485

(22) Filed: Jun. 21, 2016

(65) Prior Publication Data

US 2016/0301362 A1   Oct. 13, 2016

Related U.S. Application Data

(63) Continuation of application No. PCT/IB2014/002869, filed on Dec. 22, 2014.

(30) Foreign Application Priority Data

Dec. 23, 2013   (IN) ............................ 6045/CHE/2013

(51) Int. Cl.
*H02S 40/34* (2014.01)
*H01R 13/506* (2006.01)
(Continued)

(52) U.S. Cl.
CPC ........... *H02S 40/34* (2014.12); *H01R 13/506* (2013.01); *H01R 13/5208* (2013.01); *H01R 43/005* (2013.01); *H01R 43/18* (2013.01)

(58) Field of Classification Search
CPC ... H02S 40/34; H01R 43/005; H01R 13/5208; H01R 43/18
(Continued)

(56) References Cited

U.S. PATENT DOCUMENTS 2,536,776 A * 1/1951 Smellie ................... A47J 37/08
  15/323
2,961,688 A * 11/1960 Descarries ................ A47L 9/26
  15/323

(Continued)

FOREIGN PATENT DOCUMENTS

CN   202231384 U   5/2012
CN   102823067 A   12/2012
(Continued)

OTHER PUBLICATIONS

PCT Notification, International Search Report and Written Opinion, dated Mar. 27, 2015, 8 pages.
(Continued)

*Primary Examiner* — Harshad C Patel
(74) *Attorney, Agent, or Firm* — Barley Snyder

(57) ABSTRACT

A housing for an electrical connection of a solar panel is disclosed. The housing comprises a first body having a first recess positioned along a side wall, a second body having a second recess positioned along a side wall, the second body attached to the first body to define a confined space, a bushing positioned between the first body and the second body and received in each of the first recess and the second recess, and a cable extending from an exterior of the first and second bodies through the bushing and into the confined space such that the bushing seals the confined space from the exterior.

20 Claims, 8 Drawing Sheets

(51) Int. Cl.
 H01R 13/52 (2006.01)
 H01R 43/00 (2006.01)
 H01R 43/18 (2006.01)
(58) Field of Classification Search
 USPC ....... 439/892, 686, 687, 696, 548, 556, 604,
   439/606, 76.2, 635, 282, 449, 470;
   174/50, 522, 544, 525, 533, 563, 564, 60,
   174/650, 656–661, 260, 262, 151, 157,
   174/168
 See application file for complete search history.

(56) References Cited

U.S. PATENT DOCUMENTS

| | | | | |
|---|---|---|---|---|
| 3,491,971 | A * | 1/1970 | Fisher | F16L 3/13 24/339 |
| 4,067,526 | A * | 1/1978 | Storer | B65H 75/4476 242/400 |
| 4,654,470 | A * | 3/1987 | Feldman | H01R 4/2483 174/50 |
| 4,910,362 | A * | 3/1990 | Kinner | D06F 75/28 174/135 |
| 5,277,006 | A * | 1/1994 | Ruster | H02G 3/288 174/497 |
| 5,352,854 | A * | 10/1994 | Comerci | H02G 3/0633 174/175 |
| 5,572,319 | A * | 11/1996 | Blackman | G01N 21/8803 250/485.1 |
| 5,743,497 | A * | 4/1998 | Michael | F16L 3/223 248/316.7 |
| 5,929,381 | A * | 7/1999 | Daoud | G02B 6/4448 174/135 |
| 6,079,765 | A * | 6/2000 | Zaguskin | B60R 16/02 248/68.1 |
| 6,307,737 | B1 * | 10/2001 | Ogawa | H04N 5/64 348/843 |
| 6,492,590 | B1 * | 12/2002 | Cheng | H01F 27/04 174/17 VA |
| 6,672,897 | B2 * | 1/2004 | Tseng | F21V 19/0005 362/249.01 |
| 7,291,036 | B1 * | 11/2007 | Daily | H05K 7/20445 439/487 |
| 7,393,241 | B2 * | 7/2008 | Tanaka | G06F 1/181 439/501 |
| 7,492,590 | B2 * | 2/2009 | Chen | G06F 1/20 165/80.3 |
| 7,800,468 | B2 * | 9/2010 | Bogdon | H01H 71/0228 200/293 |
| 8,023,287 | B2 * | 9/2011 | Tachikawa | G06F 1/1616 174/135 |
| 9,077,092 | B2 | 7/2015 | Kraemer et al. | |
| 2005/0054244 | A1 * | 3/2005 | Werner | H01R 13/112 439/682 |
| 2007/0037438 | A1 * | 2/2007 | Furuya | H01R 13/5833 439/456 |
| 2007/0261880 | A1 | 11/2007 | Cox | |
| 2012/0000524 | A1 | 1/2012 | Bukovinszky et al. | |
| 2015/0053251 | A1 | 2/2015 | Hopf | |

FOREIGN PATENT DOCUMENTS

| | | | |
|---|---|---|---|
| DE | 202011005480 U1 | | 6/2011 |
| DE | 20 2011109095 | * | 12/2011 |
| DE | 102012001589 A1 | | 8/2013 |
| EP | 1912261 A1 | | 4/2008 |
| KR | 20120009310 A | | 2/2012 |

OTHER PUBLICATIONS

Abstract of EP1912261, dated Apr. 16, 2008, 1 page.
Abstract of DE102012001589, dated Aug. 1, 2013, 1 page.
Abstract of DE202011005480, dated Jun. 30, 2011, 1 page.
Chinese First Office Action and English translation, dated Apr. 10, 2017, 18 pages.
Abstract of KR20120009310A, dated Feb. 1, 2012, 1 page.
Abstract of CN202231384, dated May 23, 2012, 1 page.
Chinese First Office Action and English translation, dated Sep. 26, 2017, 2017, 15 pages.
Chinese Rejection Decision and English translation, dated Oct. 10, 2018, 11 pages.

* cited by examiner

HOUSING FOR SOLAR PANEL ELECTRIC CONNECTION

CROSS-REFERENCE TO RELATED APPLICATIONS

This application is a continuation of PCT International Application No. PCT/IB2014/002869, filed Dec. 22, 2014, which claims priority under 35 U.S.C. § 119 to Indian Patent Application No. 6045/CHE/2013, filed Dec. 23, 2013.

FIELD OF THE INVENTION

The present invention relates to a solar panel electric connection, and more particularly, to a housing for an electric connection between a solar panel and a cable system.

BACKGROUND

As is known in the art, a junction box may be mounted on a solar panel and electrically connected to solar cells of the panel. During installation of the solar panel, the junction box is opened and an electrical connection is made between an exterior cable system and electric contacts of the solar cells. The junction box is then closed again and, unless servicing is required, may remain unopened for several years or even several decades.

A known junction box may comprise a housing to prevent the electrical connection of the solar panel and cable system from environmental influence such as moisture, dust, and conductive objects. Known junction box housings are not capable of protecting the electrical connection for a sufficiently long duration, and mounting, unmounting and servicing of the junction box housings can be difficult. Furthermore, due to contemporary solar panel installations that comprise hundreds or even thousands of solar panels, the expense of junction box housings can be high.

SUMMARY

An object of the invention, among others, is to provide a housing for a solar panel electrical connection capable of better protecting an electrical connection of the solar panel from exterior influences at low cost. The disclosed housing comprises a first body having a first recess positioned along a side wall, a second body having a second recess positioned along a side wall, the second body attached to the first body to define a confined space, a bushing positioned between the first body and the second body and received in each of the first recess and the second recess, and a cable extending from an exterior of the first and second bodies through the bushing and into the confined space such that the bushing seals the confined space from the exterior.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a housing for an electrical connection of a solar panel. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
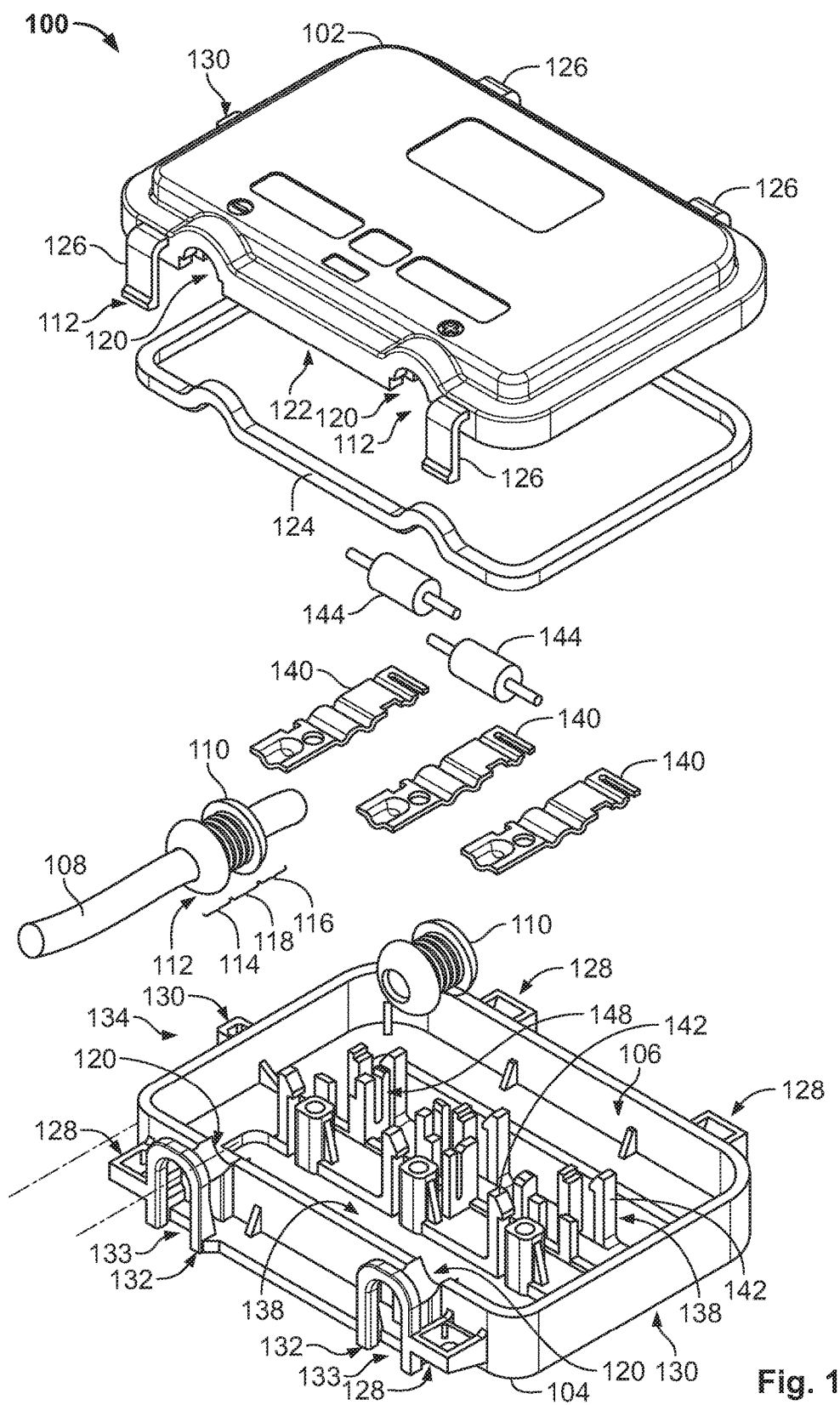
FIG. 1 is an exploded view of a housing according to the invention.

A housing 100 for an electrical connection of a solar panel is shown generally in FIG. 1. The housing 100 includes a first body 102, a second body 104, a cable 108, a bushing 110, a gasket 124, a rail 140, and a diode 144. The major components of the invention will now be described in greater detail.

The first body 102 and the second body 104 are shown in FIG. 1. Each of the first body 102 and the second body 104 have a plurality of side walls forming physical dimensions of approximately 85 mm×112 mm. The bodies 102, 104 may be formed in a mold that comes in no more than two parts.

The first body 102 and the second body 104 are adapted to be attached together to define a confined space 106 between them. One of the bodies 102, 104, for instance the first body 102 as shown in FIG. 1, has a latch 126, while the other body 102, 104, for instance the second body 104 in FIG. 1, has a corresponding recess 128 for receiving the latch 126. The latches 126 and corresponding recesses 128 are located on the outside of the corresponding bodies 102, 104. There may be several latches 126 and corresponding recesses 128 for even distribution of closing forces between the first body 102 and the second body 104. In an embodiment, the latches 126 are configured to be unlockable from the recesses 128 with a tool such as a screwdriver, or by hand without any tool at all. In another embodiment, each body 102, 104 also has an eye 130 for securing the two bodies 102, 104 together via an element threaded through the eyes 130.

Each body 102, 104 comprises at least one recess 120 positioned along a side wall of the body 102, 104, as shown in FIG. 1. Corresponding recesses 120 face each other to constitute an aperture 112 when the bodies 102, 104 are held together.

Figure 5:
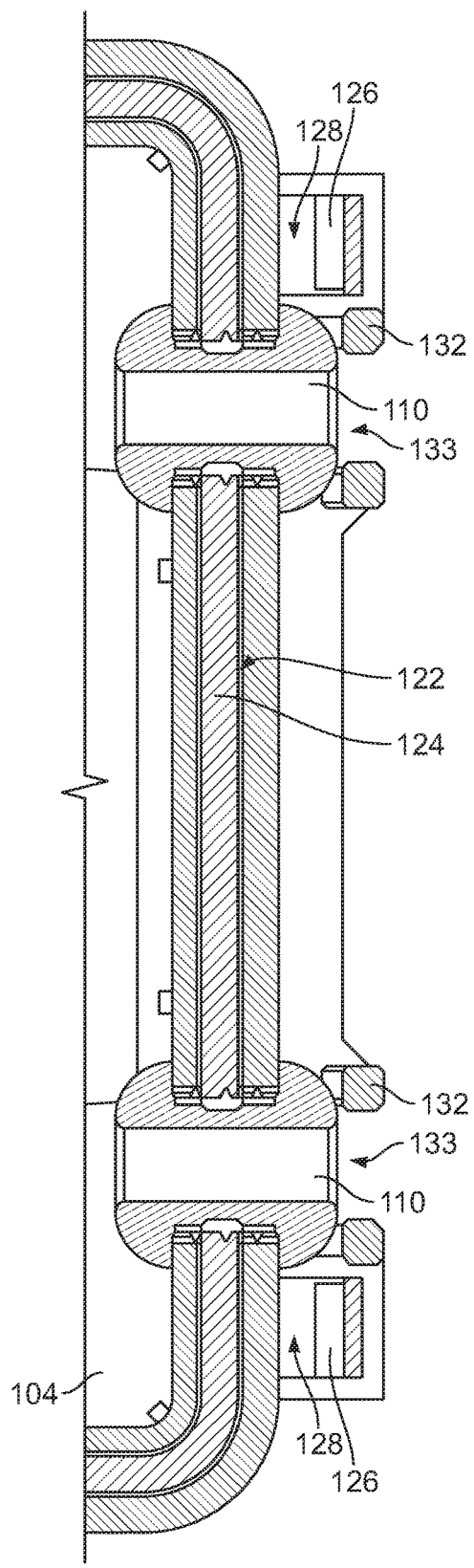
FIG. 5 is a sectional view of the housing shown in FIG. 2, taken along line II-II.

A groove 122 is formed between side walls of the bodies 102 and 104 when they are held together. The groove 122 may be formed in both bodies 102, 104, or in another embodiment, the groove 122 is formed around the side wall of only one body 102, 104, for instance the first body 102 as shown in FIGS. 1 and 5. In another embodiment, three or more grooves 122 may be formed in parallel in the bodies 102 and 104.

Figure 4:
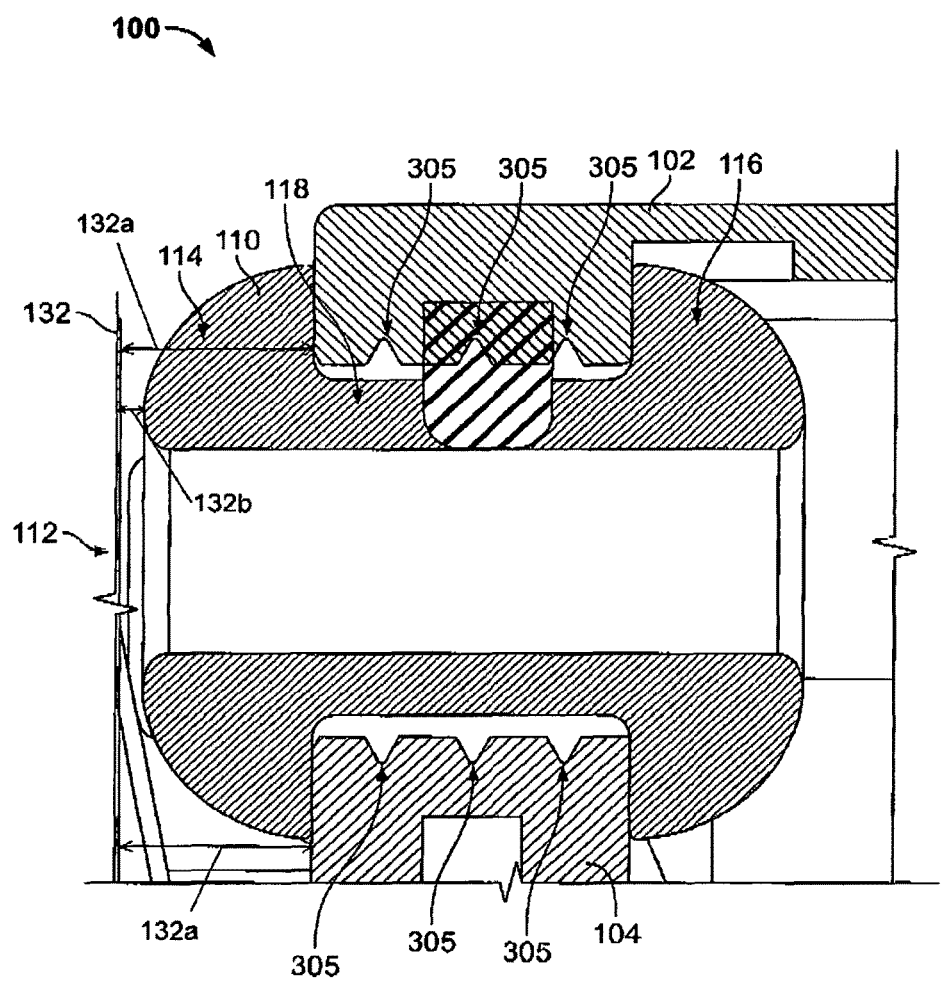
FIG. 4 is an enlarged view of the section shown in FIG. 3.

One of the bodies 102, 104, for instance the second body 104 as shown in FIG. 1, comprises a first cable guide 132 with an aperture 133. The first cable guide 132 is formed in a U-shape as shown in FIG. 1. The first cable guide 132 lies on an outside of the body 102, 104, and may be positioned to align with the recess 120. The first cable guide 132 may be formed integrally with the body 104, of a material that is more rigid than the material of the bushing 110. As shown in FIG. 4, a first gap 132a is disposed between a portion of the first cable guide 132 having the aperture 133 and both the side wall of the second body 104 and the side wall of the first body 102.

Figure 6:
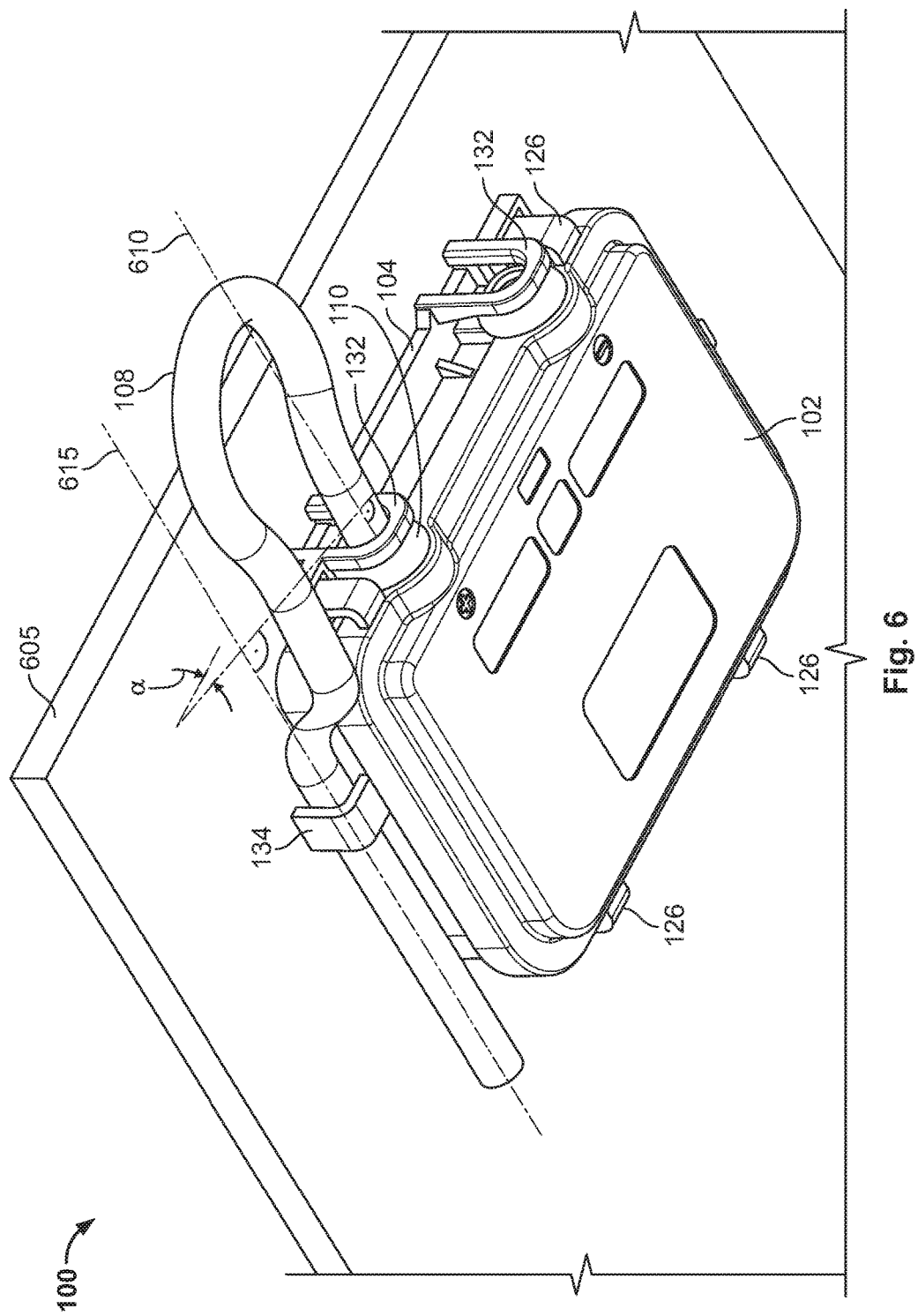
FIG. 6 is a perspective view of the housing shown in FIG. 2 mounted on a solar panel.

One of the bodies 102, 104, for instance the second body 104 in FIG. 1, further comprises a second cable guide 134. The second cable guide 134 extends in an L-shape from an exterior of the body 102, 104, as best shown in FIG. 6.

Figure 2:
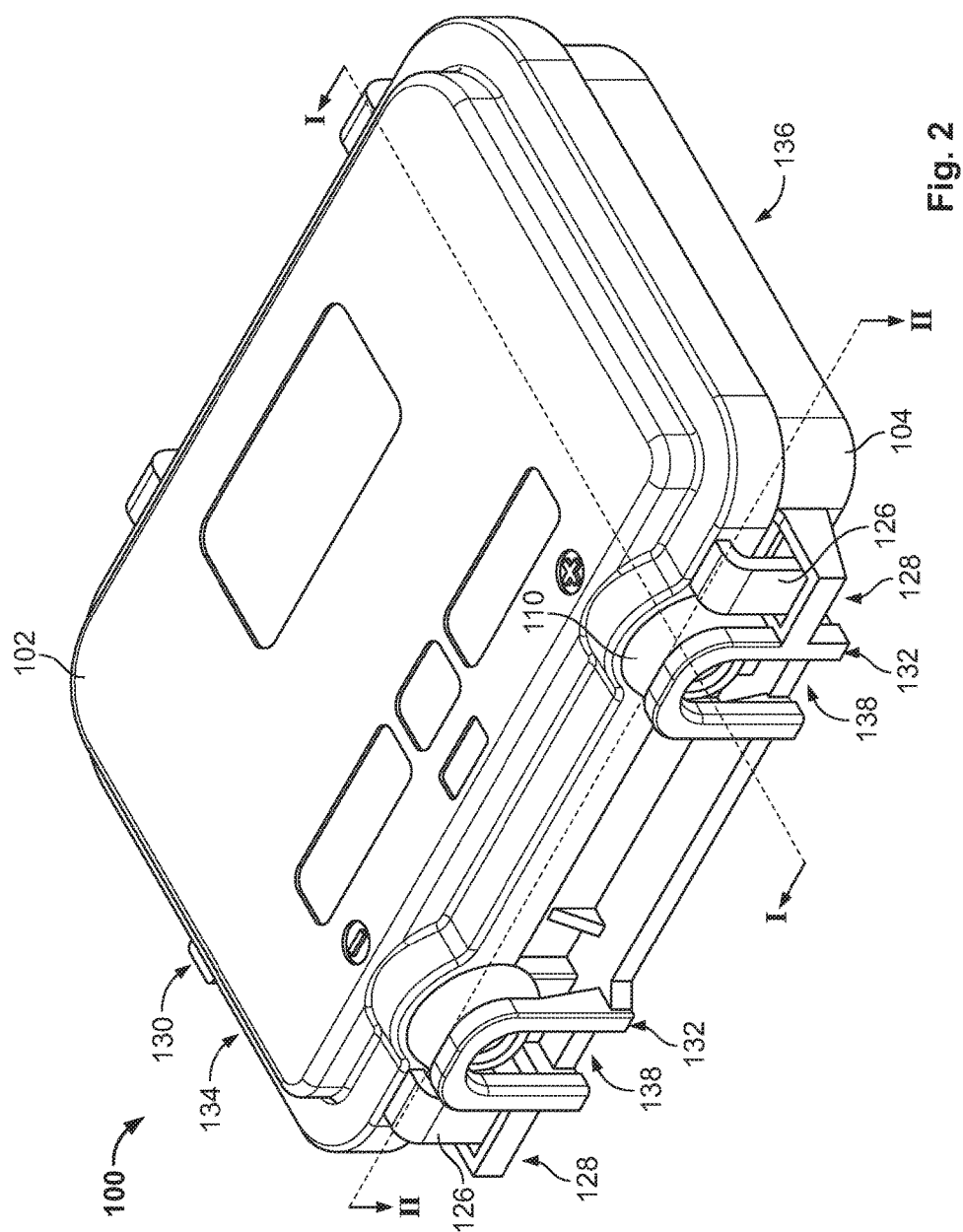
FIG. 2 is a perspective view of the housing of FIG. 1.

One of the bodies 102, 104, for instance the second body 104 in FIG. 2, may have an outer surface 136 for adhering to a solar panel. The outer surface 136 is level and may comprise one or more apertures 138, shown in FIG. 1, such that the aperture 138 is laterally surrounded by sections of the adhering outer surface 136.

One of the bodies 102, 104, for instance the second body 104 in FIG. 1, has a support 142. The body 102, 104 comprising the support 142 may also comprise a guide 148 positioned adjacent to the support 142. The support 142 may have a snap fitting.

The cable 108, shown in FIG. 1, may be any form of electrically conductive cable known to those with ordinary skill in the art. The cable 108 may have an insulative casing covering conductive wires.

The bushing 110, as shown in FIG. 1, has a first axial end section 114, a second axial end section 116 and an axial middle section 118 that lies between the first and second axial end sections 114 and 116. The axial middle section 118 has a smaller diameter than the first and second axial end sections 114, 116. The axial length of the bushing 110 is expandable, such that the axial length of the middle section 118 increases during mounting of the bushing 110. An axial aperture 112 extends through the bushing 110. A diameter of the aperture 112 is smaller than an outer diameter of the middle section 118 of bushing 110.

Figure 3:
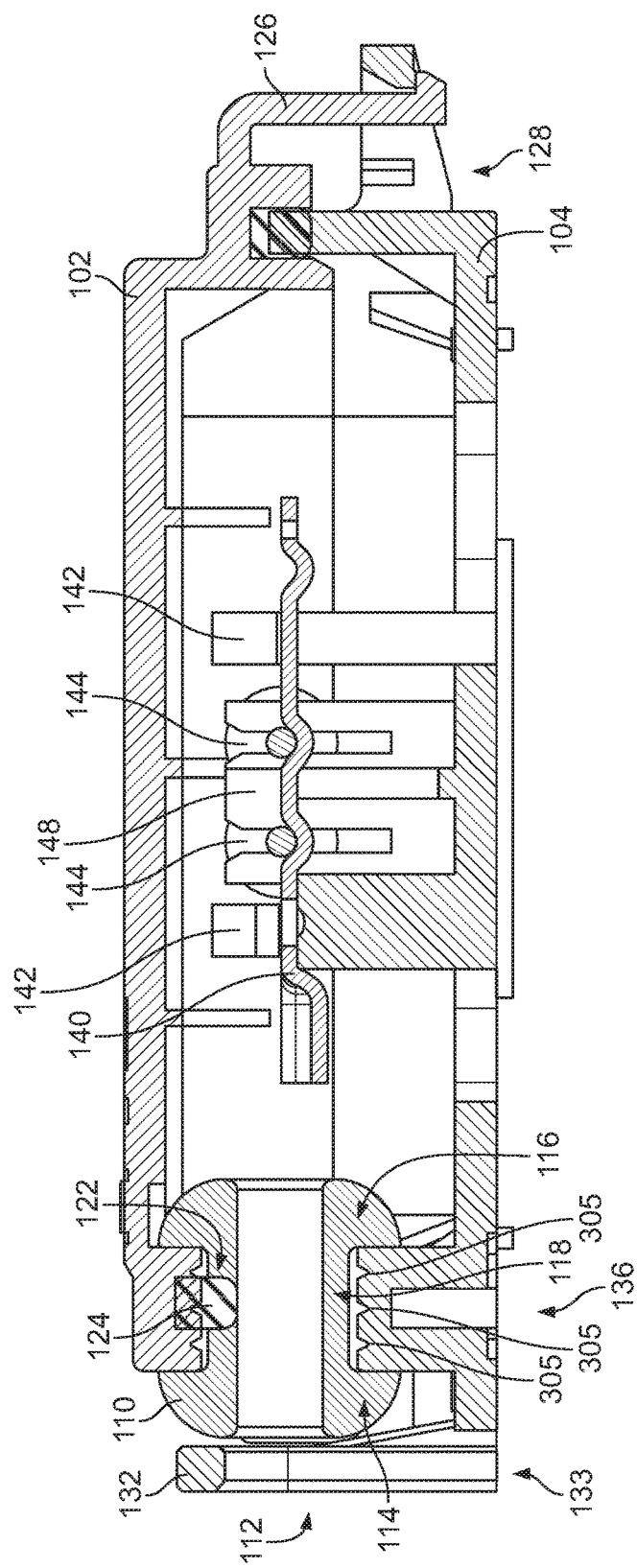
FIG. 3 is a sectional view of the housing shown in FIG. 2, taken along line I-I.

The bushing 110 also has at least one lip 305 extending from the middle section 118, as shown in FIGS. 1 and 3. The at least one lip 305 extends in a radial direction from the bushing 110 and runs in a direction around a longitudinal axis of bushing 110. In the shown embodiment, three lips 305 are positioned in parallel.

The gasket 124, shown in FIG. 1, may be continuously formed from a resilient material, for instance, made from rubber, silicone or a polymer. The gasket 124 may alternatively comprise a polymeric foam or be manufactured from a liquid. As shown in FIG. 1, the gasket 124 is essentially planar, but may have two raised portions along one side.

The rail 140, as shown in FIG. 1, is an elongated member formed of an electrically conductive material.

The diode 144 may comprise a Schottky diode, or may be any other diode known to those with ordinary skill in the art.

The assembly of the housing 100 will now be described in greater detail.

Inside the housing 100, the rail 140, support 142, and diode 144 support an electric connection of the wires of the cable 108. The support 142 is configured such that the rail 140 may be inserted into the body 104 without tools and held there by the support 142, as shown in FIG. 3. A plurality of conductive rails 140, for instance three rails 140 as shown in FIG. 1, may be provided. The conductive wires of the cable 108 are electrically connected to the rails 140.

The diode 144 is used to connect two rails 140, as shown in FIG. 3. The guide 148 clamps an electric contact of the diode 144 so that a position of the diode 144 in the body 104 is fixed. An electric connection between the diode 144 and the rail 140 may be done through this mechanism alone or another way of connecting may be in place, such as soldering the electric contact of the diode 144 to the rail 140.

The bushing 110 is positioned in the recess 120 such that side walls of the bodies 102, 104 abut opposite sides of the bushing 110; the axial length of the middle section 118 is adapted to have the same length as the axial length of the recess 120. The bushing 110 may contact the first cable guide 132. In another embodiment, there is a second gap 132b in the range of 1 to 5 millimeters, or between 2 and 4 millimeters, between the bushing 110 and the first cable guide 132, as shown in FIG. 4.

The cable 108 runs from the inside of the housing 100 through the bushing 110 and the first cable guide 132, makes a turn of about 180°, and then runs through the second cable guide 134 as shown in FIG. 6. A longitudinal axis 610 of the cable 108 at the first cable guide 132 may be further away from the solar panel 605 than another longitudinal axis 615 where the cable 108 runs through the second cable guide 134. In this embodiment, the longitudinal axes 610, 615 lie in a plane that extends at an acute angle $\alpha$ with respect to the back of the solar panel 605 and the outer surface 136. As shown in FIG. 1, two or more bushings 110 with associated apertures 112 may be positioned between the bodies 102, 104 for running more cables 108 into the housing 100.

FIGS. 2 and 6 show the housing 100 of FIG. 1 in a closed state. The latches 126 have engaged with boundaries of the recesses 128 and keep the bodies 102, 104 locked together. The gasket 124 is disposed and closed in the groove 122 between the first body 102 and the second body 104, as partially shown in FIG. 5. The gasket 124 is not interrupted by the bushing 110; instead, raised portions of the gasket 124 may circumvent the bushing 110. In the area of the circumvention, the gasket 124 may lie adjacent to bushing 110. In one embodiment, engagement of the latches 126 with the corresponding recesses 128 requires compressing the gasket 124 with a predetermined force. To disengage the latches 126, they can be bent laterally, either with a tool like a screwdriver or manually, as described above. Subsequently, the bodies 102, 104 may be separated from each other and the housing 100 may be opened.

As shown in FIG. 4, the lips 305 interact with both the first body 102 and the second body 104 when the bodies 102, 104 are held together. The lips 305 interfere with the recess 120 in the side wall of the second body 104 to form a reliable seal between the bushing 110 and the second body 104. The lips 305 similarly interfere with the recess 120 in the side wall of the first body 102, but as shown in FIGS. 3 and 4, one of the lips 305 may engage and seal with the sealing gasket 124 to form a reliable seal between the bushing 110 and the first body 102.

FIG. 6 shows the housing 100 of FIGS. 1 to 5 when the outer surface 136 is mounted on the backside of a solar panel 605. The outer surface 136 may be fastened to the backside of solar panel 605 with an adhesive. The adhesive, which may be glue or cement, is stable over temperatures up to at least 80° C. or more, as the solar panel 605 may get hot during operation. When the outer surface 136 is pressed against the solar panel 605, open structures of the first cable guide 132 and the second cable guide 134 may be closed so that the cable 108 is held on all sides. The apertures 138 are also closed and sealed by the adhesive connection to the solar panel 605.

The cable 108 has a diameter that matches the diameter of openings of the first cable guide 132 and the second cable guide 134. The cable 108 can thus be threaded through the openings 132 and 134 even after the housing 100 has been disposed on the solar panel 605, yet there is enough friction between the cable 108 and first cable guide 132 or second cable guide 134 that a longitudinal strain on the cable 108 of a predetermined force in the range of about 50 to 100, or more commonly 60 to 80 N, can be resisted. The first cable guide 132 also prevents the cable 108 from creasing when a lateral force pulls an outside section of cable 108 in a lateral direction.

Figure 7:
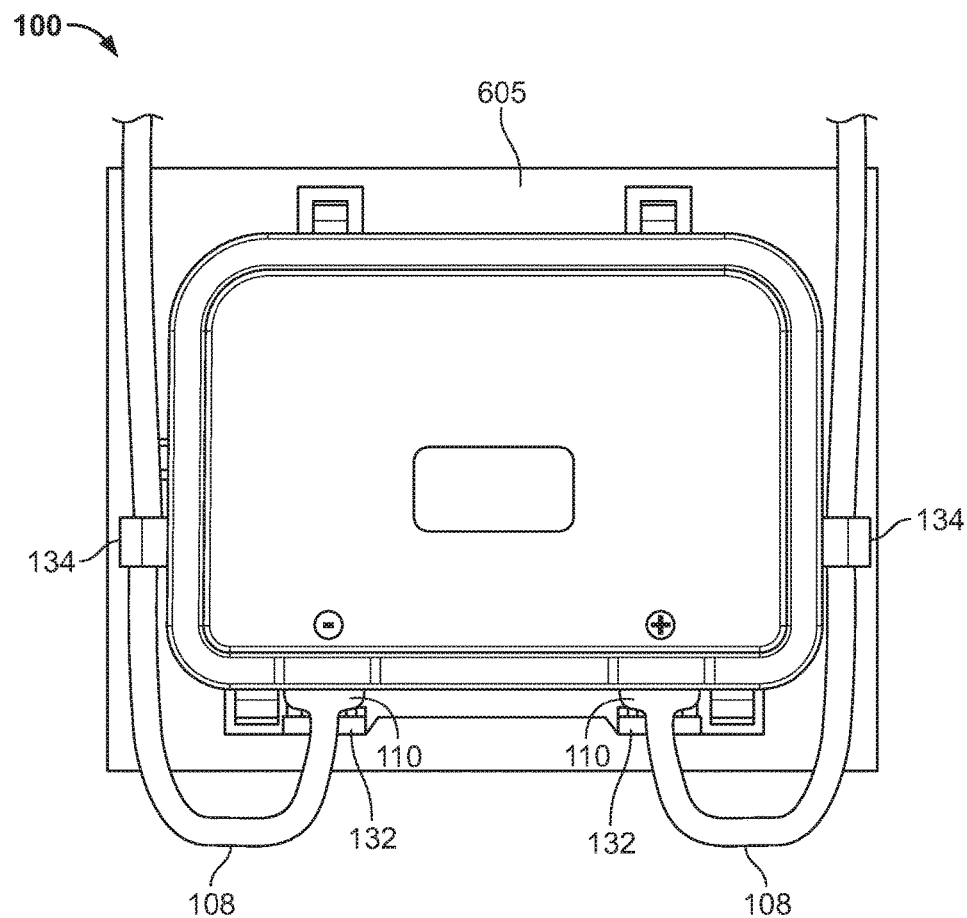
FIG. 7 is a top view of a housing according to another embodiment of the invention.

In another embodiment shown in FIG. 7, the housing 100 of FIG. 6 is mounted on the solar panel 605, and two cables 108 are electrically connected inside the housing 100. Each cable 108 runs through a corresponding second cable guide 134. In this embodiment, the cable guides 132, 134 lie on adjacent sides of the housing 100.

Figure 8:
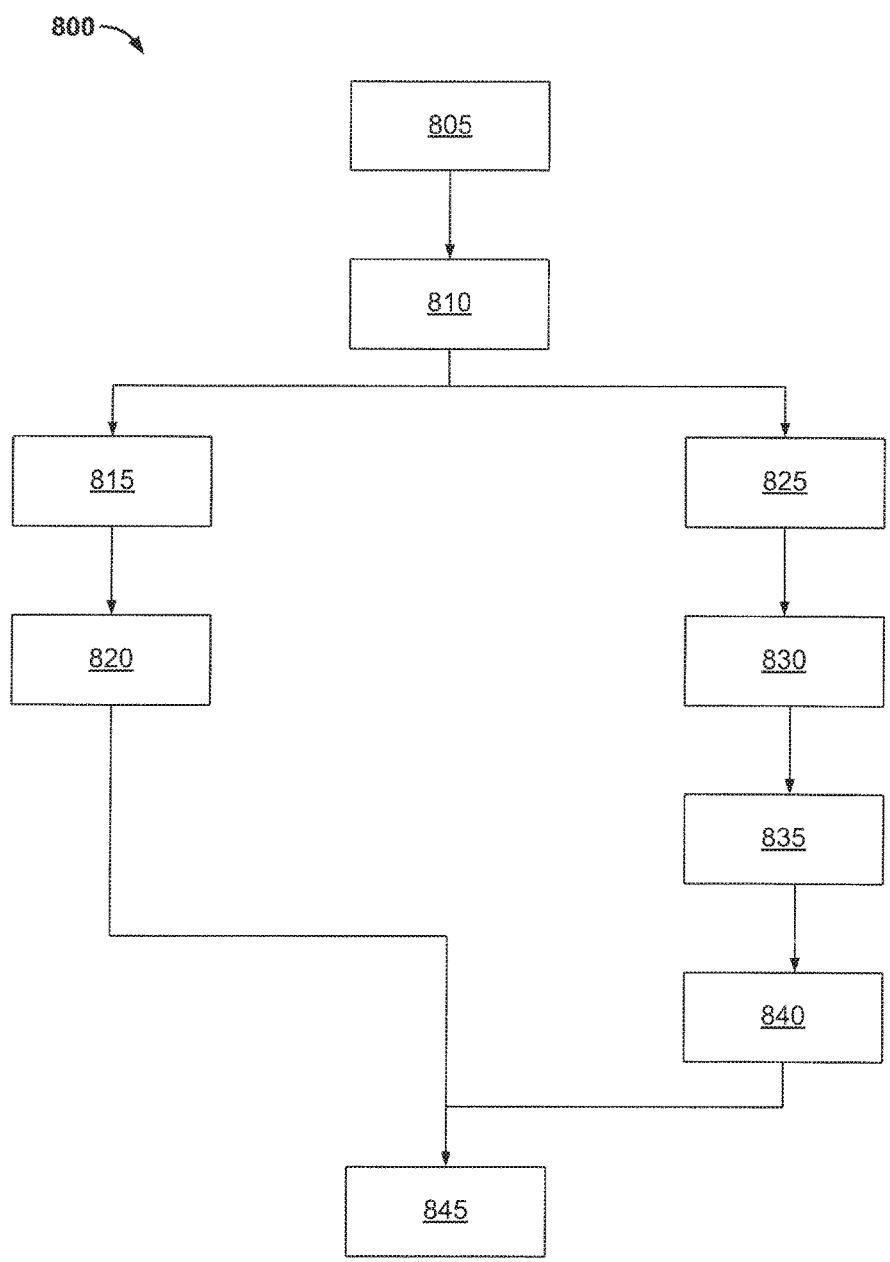
FIG. 8 is a block diagram showing steps of a method for manufacturing the housing shown in FIG. 1.

The steps of a method for assembling the housing 100 are shown in FIG. 8.

In a first step 805, the first body 102 is manufactured and in another step 810, the second body 104 is manufactured. Both bodies 102, 104 may be manufactured at the same time. At least one of the bodies 102, 104 is manufactured through injection molding, for example, using a plastic material.

In step 815, one of the bodies 102, 104, for instance the first body 102 in FIG. 1, may be fitted with the gasket 124. For example, liquid polyurethane may be applied into the groove 122 that runs around the space that is later confined by the housing 100. In a following step 820, the polyurethane forming the gasket 124 is allowed to polymerize. Polymerization can take place on the basis of moisture in the air, or water may be specifically applied to the polyurethane.

Independent from and possibly concurrent to the procedure of steps 815 and 820, the second body 104 may be fitted with further elements. In step 825, one or more rails 140 may be set into the body 104. The supports 142 hold the rail 140 in place, so setting the rails 140 in the second body 104 does not require tools.

Subsequently, in step 830, one or more diodes 144 may be set into the second body 104. This step also can be carried out without special tools, as the diode 144 is held by form or friction at the second body 104 through the guide 148. In a following step 835, the diode 144 may be soldered to the rails 140. If, during operation of the housing 100, temperatures rise so high that the soldering tin starts to get soft, the guide 148 and the support 142 still provide enough physical retention to maintain an electric connection between the diode 144 and the rail 140.

In a following step 840, the bushing 110 may be set into the aperture 112. In a variant of method 800, the bushings 110 may be set into the polymerizing polyurethane before or during step 820. The bushings 110 may then adhere to the gasket 124 that is created through polymerization of the polyurethane.

The housing 100 may be closed in an optional step 845.

Advantageously, by placing the first cable guide 132 on the outside of the housing 100, along with the optional second cable guide 134, a lateral strain in the cable 108 can be kept from the bushing 110 so that the bushing 110 may retain a seal between the cable 108 and the housing 100 regardless of the lateral strain. Furthermore, the flexibility and positioning of the bushing 110 permits elastic deformation that also retains the seal. An inside of the housing 100 can thus be better protected against influences like moisture or dust and an electrical connection that is located on the inside of the housing 100 may be better adapted to stay intact over an extended duration. Additionally, since elements of the housing 100 are formed integrally by a molding process, and the bodies 102, 104 at most comprise two molded pieces, manufacturing time and expense is saved.

What is claimed is:

1. A housing for an electrical connection of a solar panel, comprising:
    a first body having a first recess positioned along a side wall;
    a second body having a second recess positioned along a side wall, the second body attached to the first body to define a confined space;
    a first cable guide positioned on an outside of the second body and having an aperture aligned with the second recess, a first gap disposed between a portion of the first cable guide having the aperture and both the side wall of the second body and the side wall of the first body along a longitudinal axis extending through the aperture and into the confined space;
    a bushing positioned between the first body and the second body and received in each of the first recess and the second recess; and
    a cable extending from an exterior of the first and second bodies through the aperture of the first cable guide and the bushing along the longitudinal axis and into the confined space such that the bushing seals the confined space from the exterior.

2. The housing of claim 1, wherein a groove is formed between the first body and the second body when the first body and second body are attached.

3. The housing of claim 2, wherein the groove extends around the confined space.

4. The housing of claim 3, wherein a gasket is positioned in the groove.

5. The housing of claim 4, wherein the gasket is one of a polymeric foam and a silicone seal.

6. The housing of claim 4, wherein a portion of the bushing received in each of the first recess and second recesses has a lip extending circumferentially around the bushing.

7. The housing of claim 6, wherein a plurality of parallel lips extends circumferentially around the portion of the bushing received in each of the first and second recesses.

8. The housing of claim 7, wherein the plurality of parallel lips abut the second recess.

9. The housing of claim 8, wherein the plurality of parallel lips abut the first recess.

10. The housing of claim 9, wherein the plurality of parallel lips abut the gasket.

11. The housing of claim 1, wherein the bushing is formed of silicone.

12. The housing of claim 1, wherein the bushing has first and second end sections and a middle section disposed between the first and second end sections.

13. The housing of claim 12, wherein a diameter of the middle section is less than a diameter of both the first and second end sections.

14. The housing of claim 13, wherein a length of the middle section is equal to a length of both the first and second recesses.

15. The housing of claim 1, wherein a second cable guide is positioned on an outside of the second body.

16. The housing of claim 15, wherein the cable extends through the first cable guide and the second cable guide.

17. The housing of claim 16, wherein an outer surface of the housing is mounted on a solar panel.

18. The housing of claim 17, wherein the longitudinal axis of the cable at the first cable guide is further away from the solar panel than a longitudinal axis of the cable at the second cable guide.

19. The housing of claim 1, wherein a portion of the bushing is disposed in the first gap such that a second gap smaller than the first gap is disposed between the first cable guide and the bushing.

20. The housing of claim 1, wherein the first cable guide is attached to the second body only at an end of the first cable guide opposite the aperture.

\* \* \* \* \*